United States Patent
Pretorius et al.

(10) Patent No.: US 10,541,755 B2
(45) Date of Patent: Jan. 21, 2020

(54) METHOD OF FREQUENCY ENCODING BEACONS FOR DISMOUNTED IDENTIFICATION, FRIEND OR FOE

(71) Applicant: BAE SYSTEMS Information and Electronic Systems Integration Inc., Nashua, NH (US)

(72) Inventors: Hermanus S. Pretorius, Deerfield, NH (US); Aaron W. Bennett, Merrimack, NH (US); Jeffrey L. Jew, Brookline, NH (US); Ryan Bruce Zielinski, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 15 days.

(21) Appl. No.: 15/847,986

(22) Filed: Dec. 20, 2017

(65) Prior Publication Data

US 2019/0190613 A1    Jun. 20, 2019

(51) Int. Cl.
| | | |
|---|---|---|
| *H04B 10/00* | (2013.01) | |
| *H04B 10/524* | (2013.01) | |
| *H04B 10/112* | (2013.01) | |
| *H04B 10/60* | (2013.01) | |
| *H04B 10/85* | (2013.01) | |
| *H04B 10/572* | (2013.01) | |

(52) U.S. Cl.
CPC ....... *H04B 10/524* (2013.01); *H04B 10/1121* (2013.01); *H04B 10/60* (2013.01); *H04B 10/572* (2013.01); *H04B 10/85* (2013.01)

(58) Field of Classification Search
CPC .. H04B 10/524; H04B 10/1121; H04B 10/60; H04B 10/572; H04B 10/85; H04B 10/116; H04B 10/40; H04B 10/11; G08B 13/19663; H04W 4/025
USPC ........ 398/118, 116, 130, 128, 115, 183, 187, 398/189, 190
See application file for complete search history.

(56) References Cited

U.S. PATENT DOCUMENTS

| | | | | |
|---|---|---|---|---|
| 6,040,801 | A * | 3/2000 | Dawirs ................. | G01S 5/0009 342/174 |
| 7,076,261 | B2 * | 7/2006 | Austman ................ | G01S 1/024 342/385 |
| 7,926,971 | B2 * | 4/2011 | West .................... | H01M 2/1055 320/107 |
| 8,315,525 | B2 * | 11/2012 | Cunningham ....... | H04B 10/112 398/96 |
| 8,457,498 | B2 * | 6/2013 | Stewart ................ | G01S 3/786 398/108 |
| 8,648,914 | B1 * | 2/2014 | Winker ................. | F41G 3/145 244/3.16 |
| 9,483,875 | B2 * | 11/2016 | Theimer ............... | G06T 19/006 |
| 9,537,569 | B2 * | 1/2017 | Stewart ................ | G01S 3/786 |
| 9,825,701 | B2 * | 11/2017 | Juarez ................. | H04B 10/112 |

(Continued)

*Primary Examiner* — Hibret A Woldekidan
(74) *Attorney, Agent, or Firm* — Davis & Bujold, PLLC

(57) ABSTRACT

The system and method for frequency encoded beacons for use in covert dismount identification, friend or foe and communications. Waveforms are capped at thresholds below human and conventional night vision detection. Waveforms are further modulated to identify dismounts as well as other information such as day and time, rank, health status, and the like. The beacons may operate at different wavelengths depending on whether they are used on ground, in air, or at sea.

18 Claims, 8 Drawing Sheets

(56) References Cited

U.S. PATENT DOCUMENTS

| | | | |
|---|---|---|---|
| 9,879,980 B2* | 1/2018 | Shen | G01B 11/14 |
| 9,887,775 B2* | 2/2018 | Puscasu | F41H 1/00 |
| 2004/0135106 A1* | 7/2004 | Bolash | G01V 8/12 |
| | | | 250/559.4 |
| 2008/0131134 A1* | 6/2008 | Dreischer | H04B 10/118 |
| | | | 398/128 |
| 2009/0080568 A1* | 3/2009 | Lee | H03B 5/366 |
| | | | 375/306 |
| 2011/0274432 A1* | 11/2011 | Cunningham | H04B 10/112 |
| | | | 398/96 |
| 2012/0019809 A1* | 1/2012 | Shirley | G01B 11/24 |
| | | | 356/51 |
| 2013/0268980 A1* | 10/2013 | Russell | H04N 21/4122 |
| | | | 725/75 |
| 2017/0257173 A1* | 9/2017 | Harris | H04B 10/07953 |
| 2018/0004244 A1* | 1/2018 | Woodhead | H04N 21/4307 |
| 2019/0018145 A1* | 1/2019 | Roovers | G01S 19/03 |
| 2019/0257913 A1* | 8/2019 | de la Broise | G01S 3/786 |

* cited by examiner

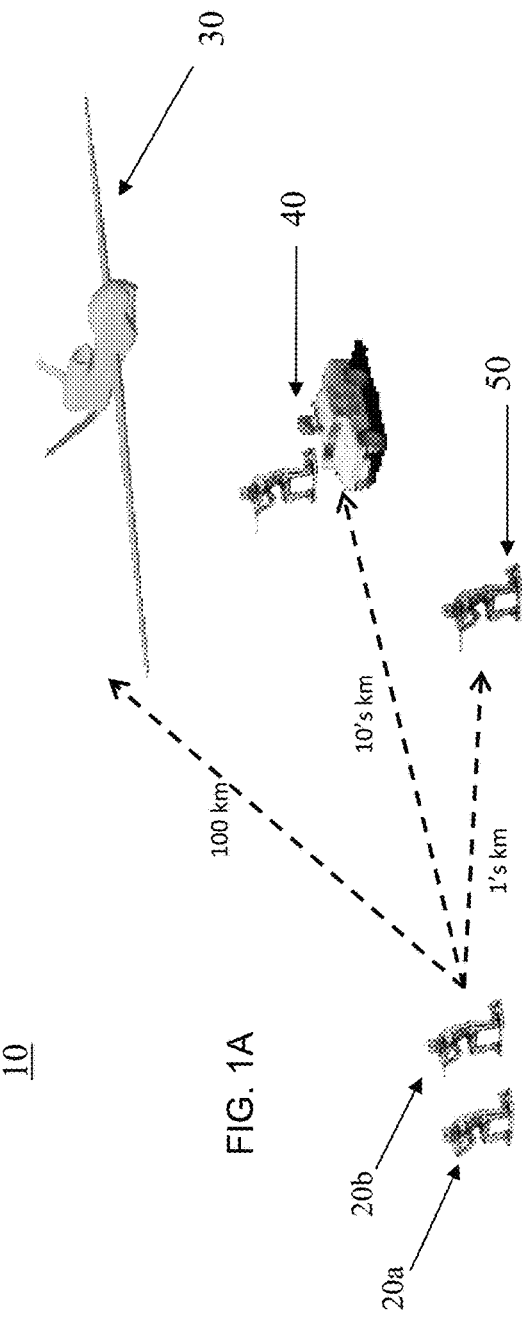
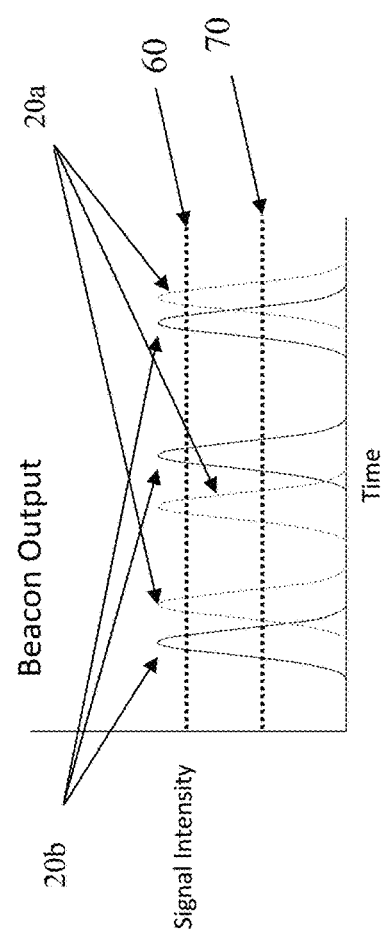

METHOD OF FREQUENCY ENCODING BEACONS FOR DISMOUNTED IDENTIFICATION, FRIEND OR FOE

FIELD OF THE DISCLOSURE

The present disclosure relates to beacon technology and more particularly to beacon technology that permits covert use by personnel by utilizing beacons that are undetectable by most night vision goggles.

BACKGROUND OF THE DISCLOSURE

Current beacon technology leaves dismounted soldiers susceptible to detection through the use of night vision goggles or photo multiplier tubes. It is understood that beacons are widely used to identify and track friendly forces. These beacons are used for dismounted command and control. In some cases, beacons are also used by close air support (CAS) for intelligence, surveillance and reconnaissance (ISR) asset visibility on the battlefield.

Current technology includes Night Vision Goggles (NVG) which typically utilizes photomultipliers tubes. These NVG are standard equipment and have sensitivity to near infrared (NIR) radiation. Thus, a tool used for command and control has become a tool for the adversary. Currently, NVGs display a bright light corresponding to dismounts, whether friendly or not.

Wherefore it is an object of the present disclosure to overcome the above-mentioned shortcomings and drawbacks associated with the prior art beacon systems which are detectable by adversarial forces.

SUMMARY OF THE DISCLOSURE

One aspect of the present disclosure is a system for frequency encoded beacons, comprising: a transmitter portion comprising, a transmitter master clock; a beacon configured to generate an output signal; and a modulation module configured to modulate the output signal from the beacon to produce an encoded output signal; and a receiver portion comprising, a receiver master clock; a high speed detector configured to detect the encoded output signal; and a demodulation module configured to demodulate the encoded output signal and decode the encoded output signal.

In certain embodiments, the system for frequency encoded beacons further comprises a user interface configured to receive the decoded output signal from the beacon.

In one embodiment of the system, the transmitter master clock and the receiver master clock are in communication with each other via a radio frequency link. In certain embodiments, the beacon produces an output signal at a wavelength greater than or equal to 700 nm.

Another embodiment of the system of frequency encoded beacons for use in covert dismount identification, friend or foe, is wherein the modulation module modulates the output signal to have a repetition frequency greater than 60 Hz which is undetectable by the human eye or photomultiplier tubes. In some cases, the repetition frequency ranges from 10 kHz to 1 MHz to encode information into the output signal.

In certain embodiments, a known modulation code, or "code of the day", is used so that the receive portion can lock on to an output signal in order to determine identification, friend or foe, or receive communications over a channel. In certain embodiments, the transmitter portion is on a dismount and the receiver portion is on a vehicle.

In yet another embodiment of the system of the present disclosure, the modulation module modulates the output signal to have a duty cycle of a fraction of a percent. In some cases, the beacon produces an output signal having pulse width ranging from about 10 ns to about 1 µs.

In some embodiments of the system the high speed detector is a Geiger-mode avalanche photodiode receiver. In other cases, the high speed detector is a digital focal plane array.

Another aspect of the present disclosure is a system for frequency encoded beacons for use in covert dismount identification, friend or foe, comprising: a receiver portion comprising, a receiver master clock; a high speed detector configured to detect an encoded output signal from a beacon; and a demodulation module configured to demodulate the encoded output signal from the beacon to decode the encoded output signal.

Yet another aspect of the present disclosure is a method for frequency encoding beacons, comprising: generating an output signal via a beacon; modulating the output signal from the beacon, via a modulation module, and encoding the output signal to produce an encoded output signal; detecting, via a high speed detector, the encoded output signal; demodulating the encoded output signal, via a demodulation module, and decoding the encoded output signal to produce a decoded output signal; and communicating to a user the decoded output signal.

One embodiment of the method for frequency encoding beacons is wherein the output signal from the beacon is at a wavelength greater than or equal to 700 nm.

In some cases, the high speed detector is a Geiger-mode avalanche photodiode receiver. In other cases, the high speed detector is a digital focal plane array.

In certain embodiments of the method for frequency encoding beacons, the modulation module modulates the output signal to have a repetition frequency greater than 60 Hz. In some cases, the transmitter portion is on a dismount and the receiver portion is on a vehicle Yet another embodiment of the method for frequency encoding beacons further comprises a known modulation code, wherein the known modulation code is used to determine identification, friend or foe, or receive communications.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1A is a diagram of a battlefield scene with one embodiment of the present disclosure in use.

FIG. 1B is a plot of intensity over time for two individual beacons according to the principles of the present disclosure.

DETAILED DESCRIPTION OF THE DISCLOSURE

Figure 2:
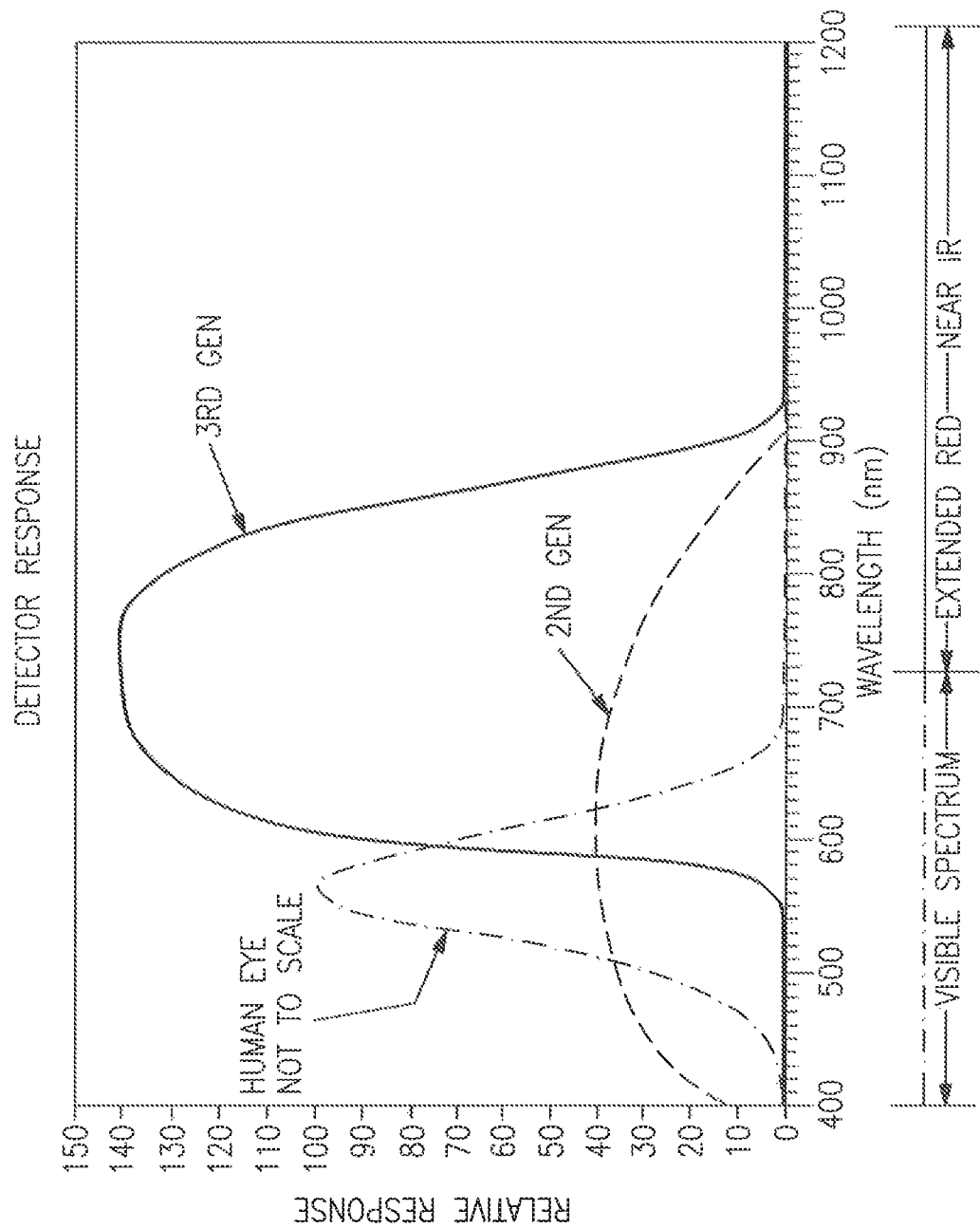
FIG. 2 is a plot of spectral sensitivity of one embodiment of night vision goggles according to the principles of the present disclosure.

In one embodiment of the system of the present disclosure a method for frequency encoding beacons is used to defeat adversarial eye-aided devices (e.g., night vision goggles) beyond a set range. Near infrared (NIR) beacons are commonly used by dismounted soldiers to track, on the ground, friendly forces and to ensure accountability of personnel. These beacons are commonly bright and can be tracked over 100s of meters using conventional night vision goggles. In one embodiment, by using waveform encoded beacons according to the principles of the present disclosure instead of conventional NIR beacons. In certain embodiments, an upper range bound can be set on the beacon's detectability, thus ensuring positive tracking of personnel within that range, but a low probability of detection beyond that range by other's using conventional techniques to allow for covert operations of dismounted troops.

In some cases, the waveforms can be modulated at such a high rate so as to appear always on (continuous wave, CW) to the human eye, but can have frequency modulated waveforms for detection by local, high speed detectors to positively identify personnel, transmit information, and include communications. Further, frequency modulation can be used to communicate information to local, high speed detectors being sent from particular personnel (e.g. health status, rank, etc.). In some cases, decreasing the pulse width causes a drop in the amount of average power of the beacon. With a short pulse, it has been demonstrated that a communication channel can be created by pulse position modulating (PPM). In some cases, pulse repetition frequencies of 100s of kHz to low MHz have been demonstrated and proven feasible.

In certain embodiments, duty cycle modulation of the beacons is used in order to remain underneath the detectable levels of power required by the aided eye; the system of the present disclosure can be used to communicate and/or positively identify key members of a dismounted patrol while not risking detection by enemy forces. Although the system has been discussed for dismount use, it can also be used for optical identification, friend or foe (IFF) for air, ground, or sea platforms. In these cases, the wavelengths of interest may be different.

In certain embodiments, the waveforms are used to encode beacons to exploit human ocular insensitivity while allowing command and control, close air support, and intelligence, surveillance and reconnaissance (ISR) assets to track and identify friendly forces. In one embodiment, high bandwidth advanced infrared cameras allow for the use of radio frequency (RF) spread spectrum communication techniques.

In certain embodiments of the system of the present disclosure, RF spread spectrum principles may be applied to modulated IR sources to reduce the probability of intercept. In telecommunication and radio communication, spread-spectrum techniques are methods by which a signal (e.g., an electrical, electromagnetic, or acoustic signal) generated with a particular bandwidth is deliberately spread in the frequency domain, resulting in a signal with a wider bandwidth. These techniques are used for a variety of reasons, including the establishment of secure communications, increasing resistance to natural interference, noise and jamming, to prevent detection, and to limit power flux density (e.g., in satellite down links).

In some cases, a single-photon avalanche diode (SPAD) is used as the receiver/detector in the system of the present disclosure. In one embodiment, the Photon Counting Geiger Mode (GM) technique is used. A SPAD is a solid-state photodetector in which a photon-generated carrier (via the internal photoelectric effect) triggers a relatively large avalanche current of short-duration. In the optical case, detection can be as low as the single photon. SPADs are also able to distinguish the arrival times of events (photons) with a timing jitter of a few tens of picoseconds.

The near single photon sensitivity and the adjustable size of the aperture are the main components of the Geiger-mode avalanche photodiode (GmAPD) receiver that allows the GmAPD receiver to overcome the intrinsic link budget limitations. A link budget accounts for all of the gains and losses from a transmitter, through a medium to a receiver in a communication system. Further, with the minimal timing jitter and the photon arrival time attributes, the GmAPD receiver is a receiver capable of resolving bandwidths up to 2 GHz, allowing for high repetition, low duty cycle waveforms to be emitted by the beacon and used for clandestine communications.

In another embodiment, Digital Focal Plane Arrays (DFPA) are used for the receiver in the system of the present disclosure. A DFPA is a sensor with a two-dimensional detector pixel matrix, e.g. for infrared light, that is positioned in the focal plane of an optical system. A DFPA is a unique sensor that is able to lock on to specific frequencies using on-chip processing. With known modulation codes, the DFPA is able to process specific codes using on-chip processing capable of reducing background clutter.

In certain embodiments, modulation above 60 Hz reduces the average power below that of typical night vision detection and human detection thresholds. Beyond 60 Hz, the human eye is not able to recover the modulation code and the modulation code appears to be a continuous wave signal. However, the signal is recoverable with correct demodulation. Modulation changes allow tracking and the identification of key waveforms. In certain embodiments, in order to maximize usable bandwidth, modulation codes in the 100s of kHz or single MHz are used. In some cases, modulation may include VIP codes, or the like, to designate commander/platoon leader. In certain cases, the modulation can be time varying to include codes for the day/hour/sec or the like.

Referring to FIG. 1A, a diagram of a battlefield 10 with one embodiment of the present disclosure in use is shown. In this displayed scenario, one or more covert IR beacons 20a, 20b are being modulated with varying codes. The battlefield may include aircraft 30, such as a GM equipped ISR UAV as well as support vehicles 40, such as a tank or troop carrier with DFPA equipped ground forces. According to the present techniques, the assets 30, 40 are therefore able to identify the soldiers using the covert beacons 20a, 20b by identifying the varying modulation frequencies, while hostile ground forces using NVGs 50 are not. In a situation like this, similar to the way radio stations work, the modulation frequencies can be indicative of certain personnel (20a, 20b): whether by rank or function.

Referring to FIG. 1B, a plot of two beacons 20a, 20b according to the principles of the present disclosure is shown. More specifically, the human eye has an intrinsic aided (with use of night vision goggles) and unaided detectable average power level. In many forms, this detectable power level is based on contrast. FIG. 1B demonstrates that there is a photomultiplier tube (PMT) average power threshold 60 that the human eye can detect and the figure visually describes that one embodiment of the present disclosure solves the problem of selective detection with modulation of the beacons in such a manner to maintain a waveform average power level 70 that is significantly less than that of the human detection threshold. In FIG. 1B, two separate beacons 20a, 20b are modulated differently as to provide, at the least, a distinction between each of the dismounts. In one embodiment, nominal duty cycles are in the fractions of a percent with nominal pulse widths being in the 10s of ns at repetition frequencies in the 100s of kHz. In other embodiments, pulse widths may range from 10s of ns to 1 µs.

It has been demonstrated that with modulated waveforms according to the principles of the present disclosure, detection of the beacons cannot be seen by adversaries outside of 200 m but can be detected by GmAPDs, or DFPAs, for example that are placed more than a km away. This allows for use with close air support. Further modifications to the system can be made to increase standoff distance for detection by friendly forces. In some cases, integration time and/or aperture size can be modified. For the system using a DFPA as a receiver, due to the processing capability and on-chip clutter rejection, the ranges detected by the DFPA exceed that of typical NVGs in the 100s of meters to upwards of a km of standoff distance.

Referring to FIG. 2, given the large spectral sensitivity of typical night vision goggles ($2^{nd}$ and $3^{rd}$ generation), there are numerous bands or colors that can be used to identify various components. In many cases, NVGs utilize photomultiplier tube technology. In certain embodiments, NVGs have spectral sensitivity from the visible (>500 nm to <1 um). Therefore, it is possible to use various wavelengths to conduct missions like IFF or communications between various different platforms (e.g. dismounted soldiers, trucks, ships, and the like). It is important to note that, by using wavelengths that are towards the outer band of the NVG sensitivity (>900 nm), more power can be emitted by the beacon for equivalent contrast in order to increase the standoff range of the receivers of the present disclosure (e.g. GmAPD or DFPA). In certain embodiments, beacon wavelengths range from about 750 nm to about 1000 nm for integration with NVGs. In certain embodiments, beacon wavelengths range from about 750 nm to about 2000 nm without compliance with NVGs.

Figure 3:
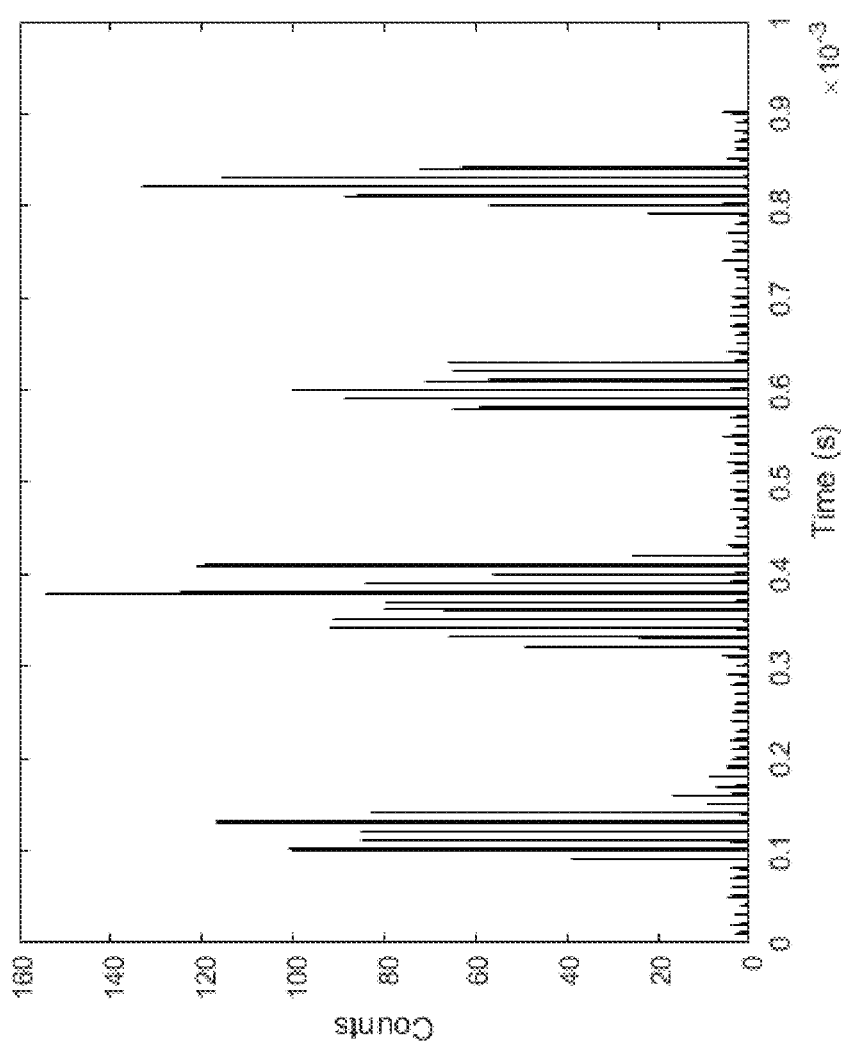
FIG. 3 is a plot of the modulation of a beacon over time using a Geiger-mode avalanche photodiode receiver according to the principles of the present disclosure.

Referring to FIG. 3, a plot of the modulation of a beacon over time through a Geiger-mode avalanche photodiode (GmAPD) receiver according to the principles of the present disclosure is shown. More specifically, the aided human eye is not able to demodulate or see the apparent modulation code that is on the waveform. Demonstrated in FIG. 3 is the ability to modulate the light intensity, using fast detectors like the GmAPD or the DFPA for use in broadband signal communication. The aided human eye only sees an increase or decrease in average power levels of the modulated light depending on the duty cycle of the waveform.

Figure 4:
FIG. 4 shows an image of a modulated beacon as seen through conventional night vision goggles and the human eye.

Referring to FIG. 4, an image of a modulated beacon as seen through conventional night vision goggles and the human eye is shown. More specifically, a bright light indicating a dismount is shown within the circle. Depending on the frequency of the signal modulation the light will appear solid using a typical NVG as if no modulation is present. As the distance between the beacon and the NVG increases, the typical NVG will not be able to see anything at all, but the high speed detectors of the present disclosure will be able to detect the presence of a beacon and will also be able to demodulate the signal used in a one-way communication as a form of beacon identification.

Figure 5:
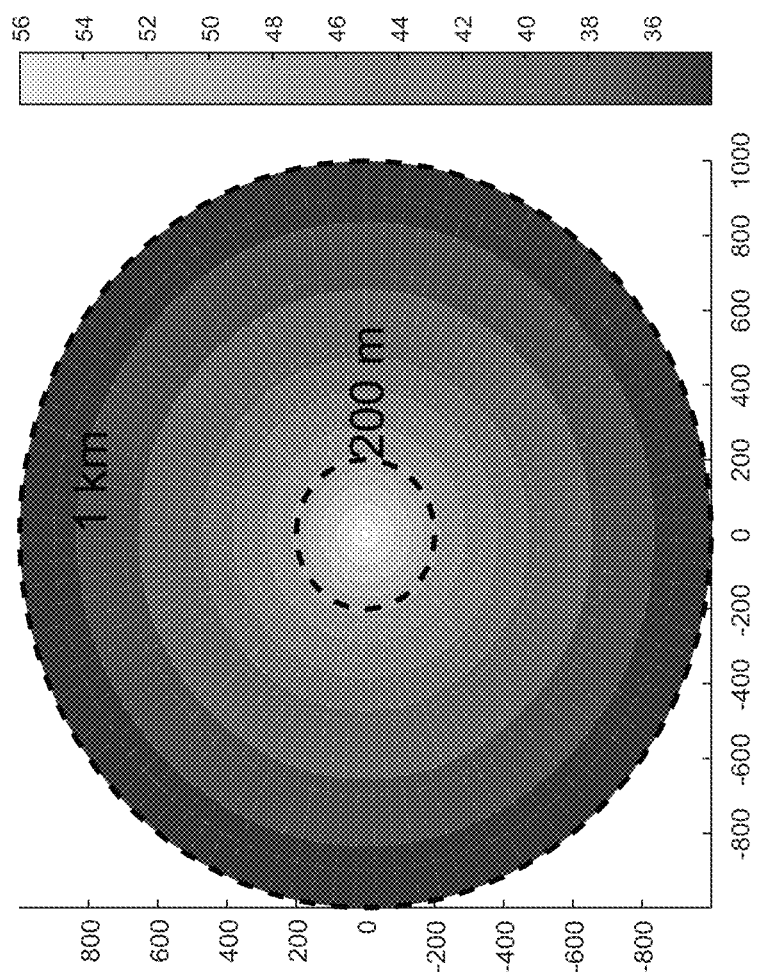
FIG. 5 shows a plot of the signal to noise (SNR) level using night vision goggles clamped at 200 m according to the principles of the present disclosure.

Referring to FIG. 5, a plot of the signal to noise (SNR) level with detection of night vision goggles clamped at 200 m according to the principles of the present disclosure is shown. More specifically, the dotted line is the maximum output power of the night vision goggle (NVG) set so that the beacon will not be detected beyond 200 meters; this level is indicative of the detection capability of the human eye with the assistance of typical NVGs. Using that same power level, the signal to noise (SNR) ratio is shown as a function of range from that beacon. At ranges of 1 km from the beacon, it is anticipated that the beacon with have nearly 30 dB of SNR. It is still expected to have more than 10 dB of SNR as standoff ranges up to 10 km are reached.

Figure 6:
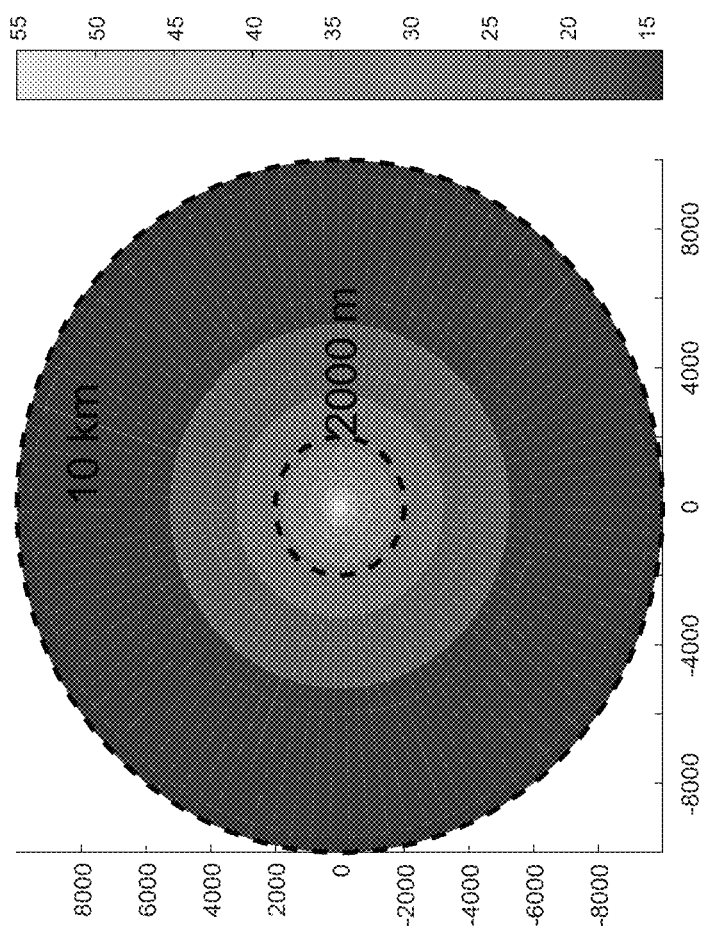
FIG. 6 shows a plot of the signal to noise (SNR) level using a Geiger-mode avalanche photodiode at ranges up to 10 km according to the principles of the present disclosure.

Referring to FIG. 6, a plot of the signal to noise (SNR) level with a Geiger-mode avalanche photodiode at ranges up to 10 km according to the principles of the present disclosure is shown. More specifically, it is believed that one relevant CONOP for this type of application would be the use of the system for dismounted forces. For dismounted forces, detection of the identification beacons by adversaries within 200 m is generally acceptable as that allows friendly forces to be within an effective engagement range. For ranges exceeding 200 m, the identification beacons need to be undetectable by adversaries, in part, because at this distance, friendly forces are attempting to close in on adversarial locations covertly. In certain embodiments, with the use of the presented beacon modulation patterns and relevant detectors, it is feasible to detect and track friendly forces by close air support to ranges in excess of 1 km away and perhaps up to 10 km. This gives friendly forces the ability to identify, track, and communicate with close air support as they engage enemy locations.

Figure 7:
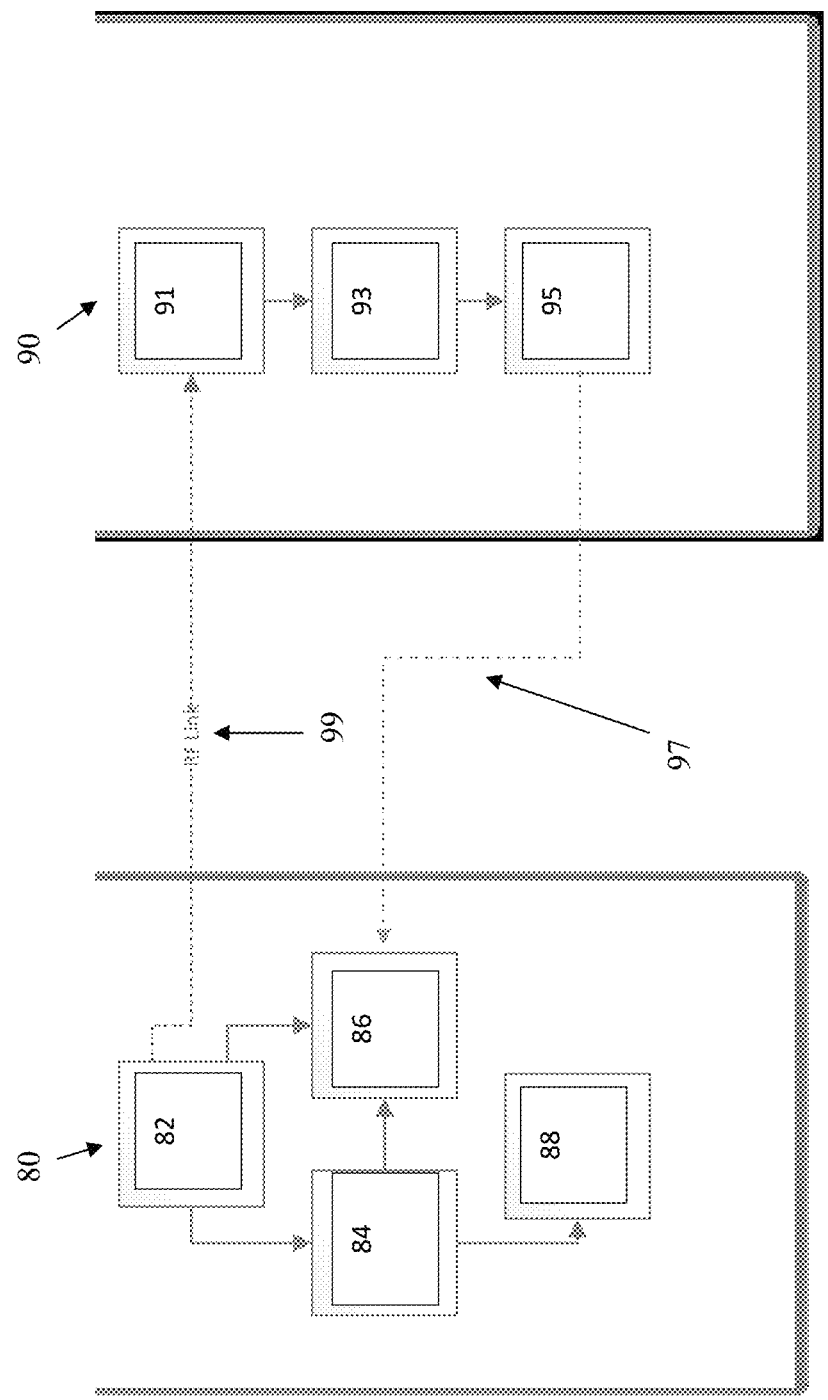
FIG. 7 is a high-level diagram of one embodiment of the system of the present disclosure.

Referring to FIG. 7, a high-level diagram of one embodiment of the system of the present disclosure is shown. More specifically, a portion of the system for receiving beacon information 80 may be located on a vehicle, wheeled or airborne, or may be on another dismount. Another portion of the system for transmitting the beacon information 90 is generally on a dismount. In certain embodiments, both the transmit and the receive portions of the system comprise a master clock for synchronization. In some cases they are connected via an RF link or the like 99. The transmit portion will further comprise modulation electronics 93 for varying the output signal from the beacon 95. The receive portion of the system will generally further comprise detection algorithms 84 for demodulating the beacon's signals and for utilizing the detectors. In some cases, the detector is a DFPA 86. In some cases, the detector is a GmAPD 86, or the like. The modulated signal 97 is sent from the beacon 95 and received by a high-speed detector 86 according to the principles of the present disclosure. In certain embodiments, the result of detection of the beacon's signal is communicated with a user 88. In some cases that user may be a pilot or driver of a vehicle. In some cases, the result of the detection is presented on a display.

Figure 8:
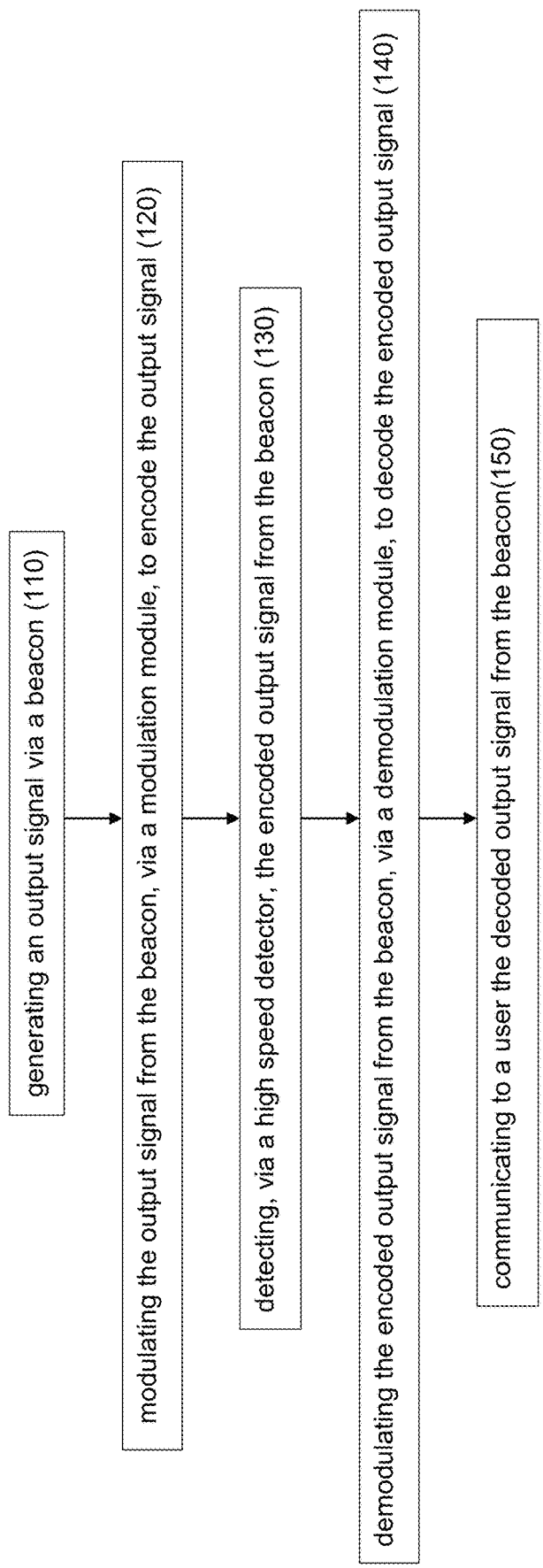
FIG. 8 is a flowchart of one embodiment of a method according to the principles of the present disclosure.

Referring to FIG. 8, a flowchart of one embodiment of a method according to the principles of the present disclosure is shown. More particularly, the method of frequency encoded beacons for use in covert communication and/or dismount identification, friend or foe, comprises generating an output signal via a beacon (110); modulating the output signal from the beacon, via a modulation module, to encode the output signal (120); detecting, via a high speed detector, the encoded output signal from the beacon (130); demodulating the encoded output signal from the beacon, via a demodulation module, to decode the encoded output signal (140); and communication to a user, the decoded output signal from the beacon (150).

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for covert frequency encoded beacons, comprising:
   a transmitter portion comprising,
      a transmitter master dock;
      a beacon configured to generate a covert output signal, wherein the output signal from the beacon is at a wavelength greater than or equal to 700 nm; and
      a modulation module configured to modulate the output signal from the beacon to produce an encoded output signal, wherein the encoded output signal has a repetition frequency greater than 60 Hz and a duty cycle underneath detectable levels of power required by the aided eye, the duty being a fraction of one percent; and
   a receiver portion comprising,
      a receiver master dock,
      a detector configured to detect the encoded output signal; and
      a demodulation module configured to demodulate the encoded output signal and decode the encoded output signal.

2. The system for frequency encoded beacons according to claim 1, wherein the transmitter master dock and the receiver master dock are in communication with each other via a radio frequency link.

3. The system for frequency encoded beacons according to claim 1, wherein the repetition frequency ranges from 10 kHz to 1 MHz to encode information into the output signal.

4. The system for frequency encoded beacons according to claim 1, wherein the output signal from beacon has a pulse width ranging from about 10 ns to about 1 µs.

5. The system for frequency encoded beacons according to claim 1, wherein the detector is a Geiger-mode avalanche photodiode receiver.

6. The system for frequency encoded beacons according to claim 1, wherein the detector is a digital focal plane array.

7. The system for frequency encoded beacons according to claim 1, wherein a known modulation code is used to encode or decode identification, friend or foe, or receive communications.

8. The system for frequency encoded beacons according to claim 1, wherein the transmitter portion is on a dismount and the receiver portion is on a vehicle.

9. The system for frequency encoded beacons according to claim 1, further comprising a user interface configured to receive the decoded output signal from the beacon.

10. The system for frequency encoded beacons according to claim 1, wherein the encoded output signal utilizes radio frequency (RF) spread spectrum communication.

11. A system for frequency encoded beacons for use in covert dismount identification, friend or foe, comprising:
   a receiver portion comprising,
      a receiver master clock;

a detector configured to detect an encoded output signal from a beacon, wherein the encoded output signal has a repetition frequency greater than 60 Hz, a duty cycle underneath detectable levels of power required by the aided eye and being a fraction of one percent, and utilizes radio frequency (RF) spread spectrum communication; and a demodulation module configured to demodulate the encoded output signal from the beacon to decode the encoded output signal.

12. The system for frequency encoded beacons according to claim 11, wherein the output signal from the beacon is at a wavelength greater than or equal to 700 nm.

13. A method for frequency encoding covert beacons, comprising:

generating an output signal via a beacon, wherein the output signal from the beacon is at a wavelength greater than or equal to 700 nm;

modulating the output signal from the beacon, via a modulation module, and encoding the output signal to produce an encoded output signal, wherein the encoded output signal has a repetition frequency greater than 60 Hz and a duty cycle underneath detectable levels of power required by the aided eye, the duty cycle being a fraction of one percent;

detecting, via a detector, the encoded output signal;

demodulating the encoded output signal, via a demodulation module, and decoding the encoded output signal to produce a decoded output signal; and communicating to a user the decoded output signal.

14. The method for frequency encoding beacons according to claim 13, wherein the detector is a Geiger-mode avalanche photodiode receiver.

15. The method frequency encoding beacons according to claim 13, wherein the detector is a digital focal plane array.

16. The method for frequency encoding beacons according to claim 13, further comprising a known modulation code, wherein the known modulation code is used to determine identification, friend or foe, or receive communications.

17. The method for frequency encoding beacons according to claim 13, wherein a transmitter portion is on a dismount and a receiver portion is on a vehicle.

18. The method for frequency encoded beacons according to claim 13, wherein the encoded output signal utilizes radio frequency (RF) spread spectrum communication.

* * * * *